Aug. 21, 1973 W. B. BLACK 3,754,066
METHOD OF COATING OR LINING A STRUCTURAL SURFACE
Filed Aug. 27, 1971 9 Sheets-Sheet 6

United States Patent Office 3,754,066
Patented Aug. 21, 1973

3,754,066
METHOD OF COATING OR LINING
A STRUCTURAL SURFACE
William Brown Black, Penwold, Kilbarchan Road,
Bridge of Weir, Scotland
Filed Aug. 27, 1971, Ser. No. 175,512
Claims priority, application Great Britian, Sept. 1, 1970,
41,776; Jan. 28, 1971, 3,427; Apr. 3, 1971, 8,600
Int. Cl. B28b 1/08; F27d 1/16
U.S. Cl. 264—71                                      9 Claims

ABSTRACT OF THE DISCLOSURE

In the cladding, that is coating or lining, a structural surface with a cementitious compound, for example a refractory concrete, there is disposed adjacent said surface a mould open onto said surface and the cementitious compound is filled into said mould while the mould is vibrated to compact said compound. The surface to be clad preferably has secured thereto to project forwardly therefrom nonlinear ties adapted to key into the cladding and the mould is made up of vertical guide members releasably secured to said surface and guiding for upwards displacement parallel to said surface a shutter plate making up with said guide members said mould open onto said surface, the shutter plate being raised, if necessary with mechanical assistance, while the cementitious compound is being filled into said mould and said shutter plate is being vibrated to compact said compound. The apparatus is dismounted from said structural surface, and remounted at another portion of said surface and utilized to form blocks of cementitious material bonded to said surface at small intervals apart in the horizontal direction. A second shutter plate bridges between said block and is utilized to fill the space between said blocks with a cementitious compound.

---

This invention relates to the coating of structures, and is especially applicable to the lining of conduits in oil-refining plants and the lining of blast furnaces and other structures where confining walls are protected by a refractory lining, for example, an aluminuous cement, but is applicable also to the cladding of structures such as pillars or columns with ferro-concrete.

Hitherto cementitious linings have been applied by projecting the cementitious compound on to the surface to be coated. This method has resulted in considerable wastage of material due to rebound or splash back from the surface at the time of application, and also to considerable variations in thickness of the coating.

According to the present invention a structural surface is coated with a cementitious compound disposing adjacent said surface a mould open on to said surface, filling said mould with a cementitious compound, and vibrating the mould to compact the compound.

Preferably ties are anchored at intervals to the structural surface to be coated, such ties being non-linear, for example, being bifurcated, and extending in the direction away from said surface about half the depth of the coating to be applied.

The invention will now be described, by way of example, with reference to the accompanying drawings, in which.

Figure 1:
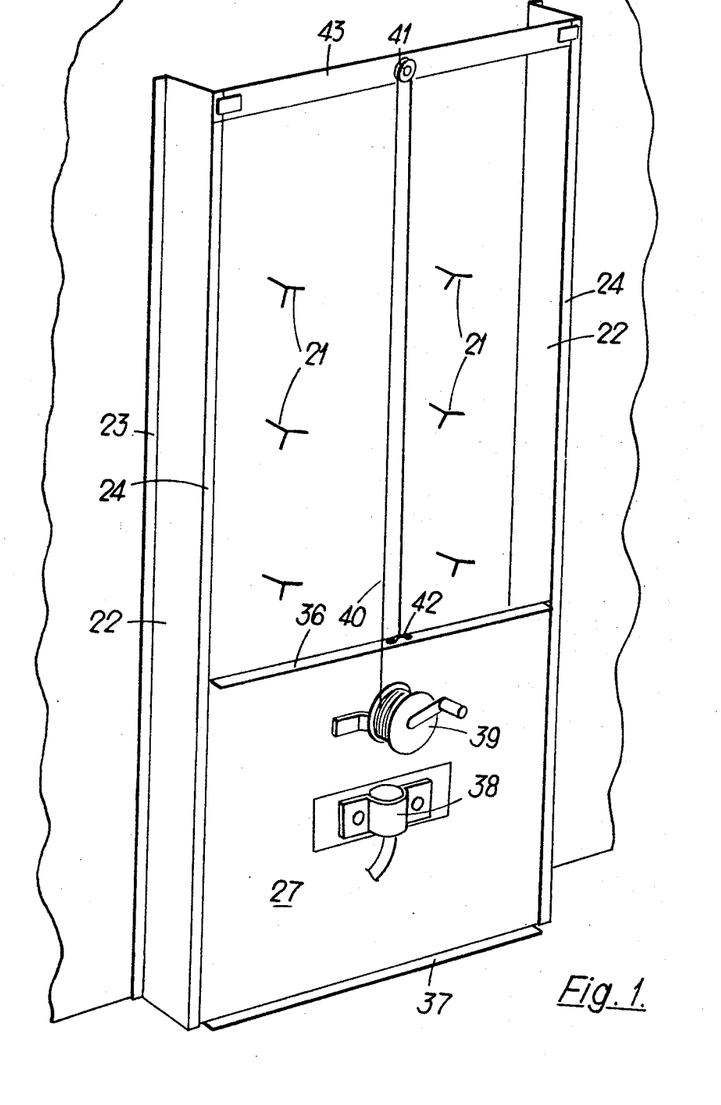
FIG. 1 is a perspective view illustrating the coating of a structural surface by the method of the present invention.
Figures 2, 3, 4:
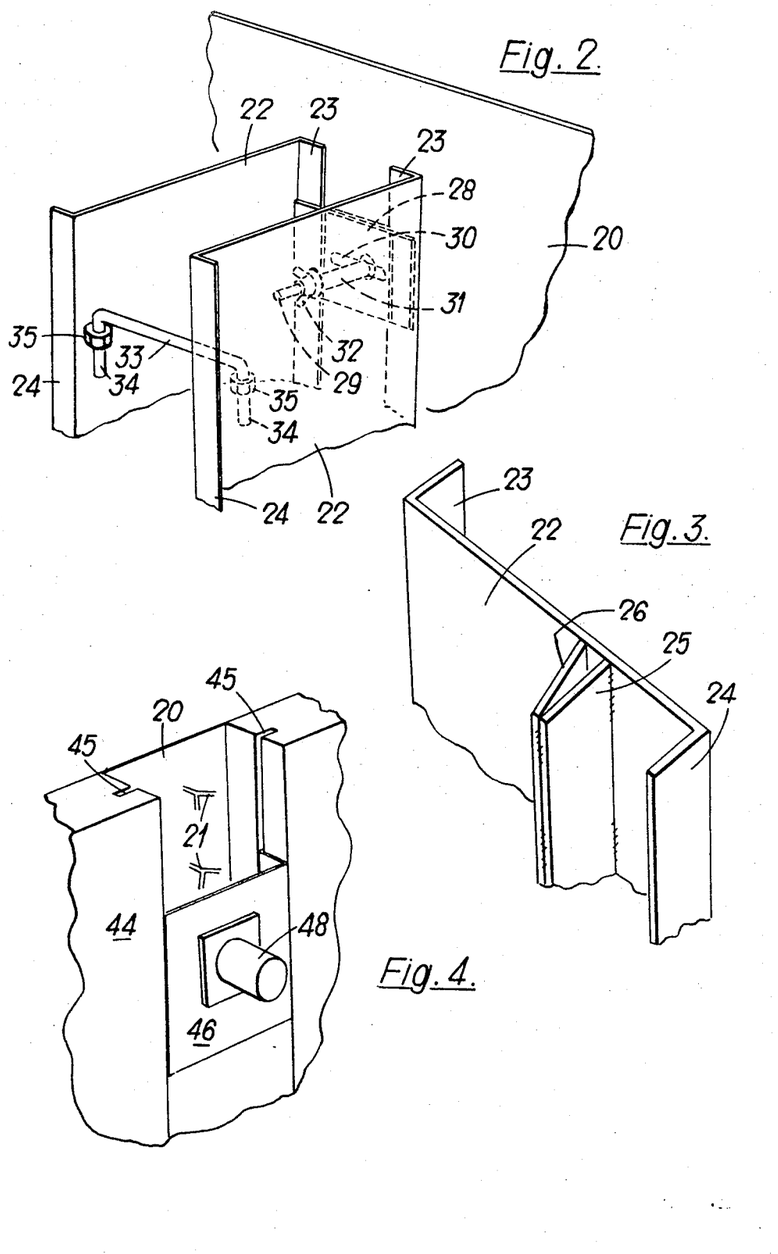
FIG. 2 is a fragmentary perspective view illustrating the mounting of guides on the structural surface.
FIG. 3 is a fragmentary perspective view on a larger scale illustrating a guide.
FIG. 4 is a fragmentary perspective view illustrating the infilling of spaces between blocks cast on the structural surface.

Referring now to the drawings, and firstly to FIGS. 1 to 4 thereof, a structural surface 20 is to be coated with a cementitious compound. The surface 20 may be the inner metalic surface of a tank and the cementitious compound be a refractory concrete such as an aluminous cement. The surface 20 is cleaned and Y-shaped ties 21 are welded thereto to extend forwardly therefrom with the stems of the ties anchored to the surface 20. The ties 21 are substantially regularly spaced both horizontally and vertically. Vertical guides 22 are next secured to the surface 20, the guides 22 comprising rectangular strips of metal flanged at both longitudinal edges with the flanges 23 and 24 extending in opposite directions. FIG. 3 shows part of a guide 22 in detail and it will be seen that two flat bars 25 and 26 are welded to the guide, rather nearer the front flange 24 than the rear flange 23 of the guide, with the bar 25 paralleled to the flange 23 and 24 and the bar 26 disposed at an acute angle to the bar 25, being spaced from the latter at the guide and welded together at the guide-remote edges.

Referring particularly to FIG. 22, the adjacent surface-contacting flanges 23 of alternate pairs of guides are together secured in position by clamp plates 28, the number of which depends on the lengths of the guides. Only one clamp plate 28 is shown in FIG. 2 and comprises a median portion backing on to the surface 20 and thinner side portions backing on to the flanges. To threaded stud 29 extends normally from the surface 20 in place of one of the ties 21 and the clamp plate 28 has an elongated slot 30 through which the stud 29 projects and which enables lateral adjustment of the clamp plate 28. A tubular nut 31 with a winged head 32 is tightened on the stud 29 to secure the clamp plate 28 in position. The guides 22 are secured to the structural surface 20 in spaced and parallel relationship, the spacing alternate pairs of guides being determined by the width of a rectangular shutter 27 to be slid upwardly while supported at its sides by the guides. The flanges are disposed so that the guides are flanged away from one another at their edges adjacent the surface 20 and towards one another at their edges remote from the surface 20, the surface-adjacent flanges facilitation fiixture of the guides to the structure and the surface-remote flanges providing backings for the shutter. The adjacent guides 22 of alternate pairs of guides are maintained at the correct spacing remote from the surface 20 by rods 33 of inverted U-shaped whose side limbs 34 extend downwards through the bores of nuts 35 bored to clearance and each welded at one flat to the pertaining guide. The upper and lower edges of each shutter 27 are outwardly flanged for stiffening purposes, the shutter flanges 36 and 37 stopping sufficiently short of the side edges of the shutter so as to be clear of the surface-remote guide flanges 24. The shutter has mounted on its external surface substantially centrally thereof a high-speed vibrator 38 which is remotely operated, preferably electrically and induces in the shutter plate small vibrations of high frequency. Moreover the shutter is fitted with means for mechanically raising same, such means in its simplest form being a winding gear 39 from which the rope 40 extends about a loose pulley 41 at the top of the structure and back to the shutter where it is anchored at 42. Depending on headroom available, the pulley 41 is supported on a cross-bar 43 bridging between the guides at their upper ends, but if space permits the cross-bar is replaced by a bridging member of inverted V-shape as hereinafter disclosed.

In operation with the shutter 27 in place at the bottom of the guides 22, a refractory mix is filled into the space bounded by the shutter and the guides and the vibrator 39 is operated. The mix contains no more water than is necessary for the purpose and is rapidly compacted in the mould bounded by the shutter 27, the guides 22 and the surface 20 being clad or lined, being keyed to the latter by the ties. Indeed the compaction is so rapid that it is necessary to keep topping up with the mix, and the shutter 27 is gradually raised parallel to the structure surface 20 between the guides 22. The supply of mix to the mould is preferably mechanised, e.g. by a flexible tubing feed.

The thickness of lining or coating applied in a single pass may be up to nine inches or thereabouts and as casting of each vertical block 44 (see FIG. 4) is nearing completion, a steel weight is preferably placed on the refractory mix infill to assist in consolidation. This weight is a rectangular plate which fits neatly into the upper open end of the mould and is of the order of one inch in thickness. The plate is provided on its upper surface with one or more handles to facilitate manipulation thereof. The vertical guides 22 are removed after casting of the block or strip is completed.

In covering a surface, blocks 44 are cast as hereinbefore described at small intervals apart in the horizontal direction, and the spaces between adjacent blocks 44 are then filled with the refractory mix.

Referring now particularly to FIG. 4, the cast blocks 44 have oppositely-disposed vertical grooves 45 because of the inset into the mould provided by the bars 25 and 26. Use is made of a modified shutter 46 flanged at its sides to provide side flanges 47 outwardly turned at their fore ends to engage slidingly in the grooves 45. The shutter 46 has a high-speed vibrator 48 mounted substantially centrally on its outer surface and adapted when operative to induce in the shutter small vibrations of rapid frequency. The shutter 46 is of much lesser width than the shutter 27 and no mechanical assistance is required on raising same while the filling is being cast.

Manifestly the FIG. 2 construction could be modified by dispensing with the clamp plate 28 and integrating the flanges 23 to provide a U-shaped or double guide. Where use is made of a cross-bar 43, the latter is left in position until the cast block has set and the guides 22 can be removed.

Figure 5:
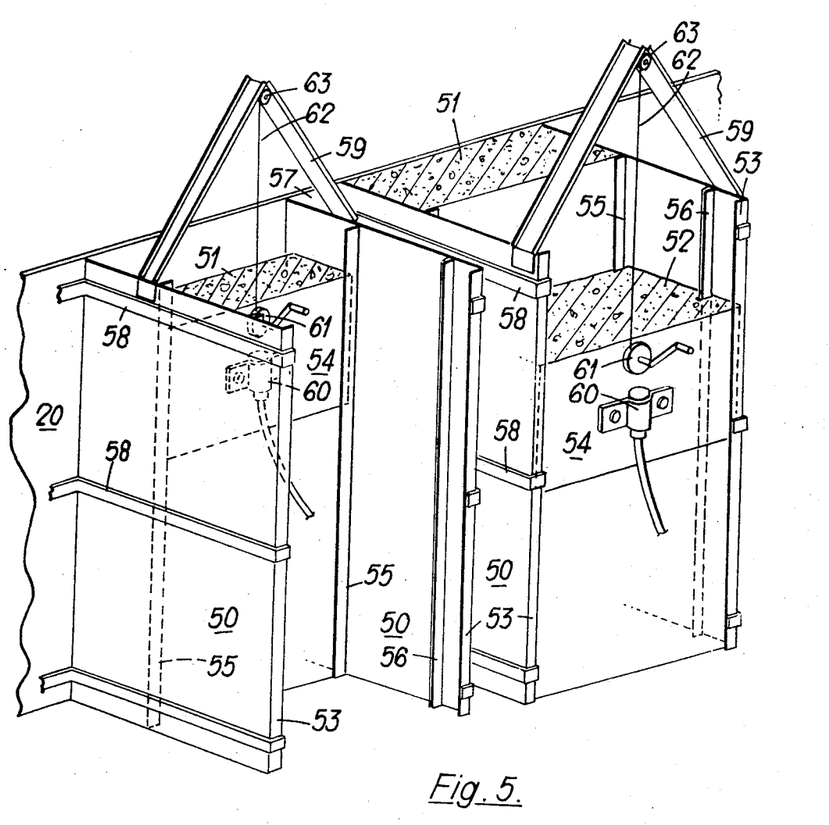
FIG. 5 is a perspective view illustrating stages in the casting of a double lining on a structural surface.

Referring now to FIG. 5, the structural surface is that of a rectangular vessel to be lined with a double lining, namely a back lining adjacent the surface 20 and a face lining remote from the surface 20. Use is made in this instance of shutter guides 50 which extend the full thickness of the contemplated double lining and have inwardly-directed flanges for shutter guidance in the casting of both back lining blocks 51 and face lining blocks 52. Thus apart from front end flanges 53 for guiding a shutter 54 when casting a face lining block 52 there are intermediate flanges 55 for guiding the shutter 54 when casting a back lining block 51. The face lining is much thicker than the back lining and the guides have inwardly-directed vertical ribs 56 to provide grooves in the face lining blocks for shutter guidance during infilling as hereinbefore described. In this instance the adjacent guides 50 of the alternate pairs of guides are part of a U-shaped or double guide whose connecting web 57 is in contact with and is secured to the structural surface 20. The U-shaped double guides are provided internally with horizontal reinforcing straps 58 through which they are secured in position by construction similar to that heretofore described for the clamp plate 28 in FIG. 2. In this instance, moreover, headroom is available and use is made of members 59 of inverted V-shape bridging between adjacent guides 50 of the pair of guides defining moulds with the shutter plates 54. As before, each shutter plate 54 has mounted on its external surface substantially centrally thereof a high-speed vibrator 60 adapted when operating to induce in the shutter plate small vibrations of high frequency. The shutter plate 54 is fitted with a winding gear 61 from which a rope 62 extends to an anchorage 63 at the apex of the member 59.

In casting the double lining, the back lining blocks 51 are first cast as hereinbefore described. Each shutter 54 with its appurtenances is removed and fitted into its new position in sliding contact with the flanges 53 at the front edges of the guide plates 50 defining the sides of the moulds. The members 59 are also removed and fitted in their new positions near the fronts of said guide plates 50. The face lining blocks 54 are now cast using the procedure hereinbefore described, but in this case the moulds are open in to the back lining blocks 51. After the lining blocks have hardened, the shutter 54 and members 59 are removed and the guides 50 are unfastened from the surface 20 and withdrawn. The gaps firstly between the back lining blocks 51 and then between the face lining blocks 52 are filled in the manner substantially as hereinbefore described with reference to FIG. 4. The back lining may be a heat-insulating lining and the face lining a refractory lining.

Figure 6:
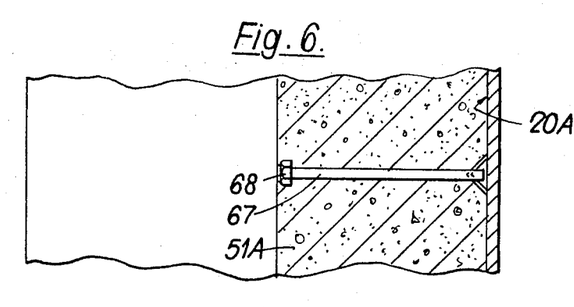
FIG. 6 is a side elevation illustrating the roof part of a composite tie used in the casting of a double lining on a structural surface.
Figure 7:
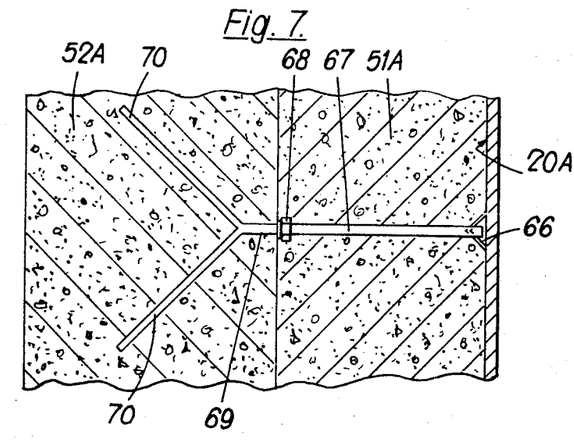
FIG. 7 is a side elevation illustrating a complete composite tie used in the casting of a double lining on a structural surface.

Referring now to FIGS. 6 and 7 of the drawings also concerned with the formation of a double lining on a structural surface, this embodiment differs from that illustrated in FIG. 5 only in that use is made of two-part non-linear ties. Hence parts already identified in FIG. 5 are denoted by the same reference numerals but with the suffix A. The two-part non-linear tie illustrated comprises an elbow-shaped rod or shank with a shorter arm fitting downwardly into a sleeve 66 secured with its bore vertical to the structural surface 20A and a longer arm 67 extending forwardly substantially the full thickness of the back lining 51A to be cast, the free end of the longer arm mounting a tapped nut 68 which is plugged while the back lining blocks are cast. After the back lining blocks have been cast, the plugs are removed from the sockets of the nuts 68. The plugs may be of a plastic material and are preferably distinctively coloured. The second part of the tie is of Y-shape with its stem 69 threaded to engage in the tapped socket of the nut 68 and then dispose the mutually-splayed 70 substantially horizontally. The blocks of the face lining 52 are then cast.

Figure 8:
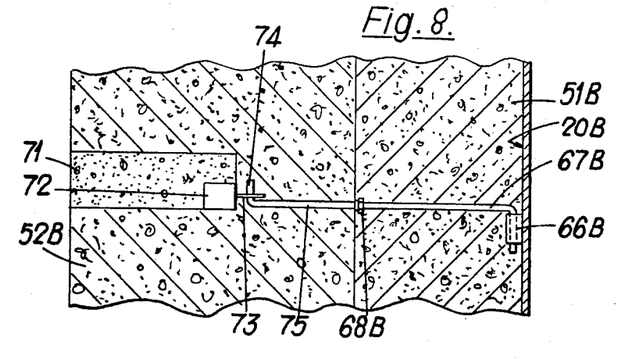
FIG. 8 is a view similar to FIG. 7 illustrating an alternative completion of the composite tie.

Referring now to FIG. 8 of the drawings, the embodiment of the invention shown therein differs from that of FIG. 7 only in the second part of the two-part non-linear tie. Accordingly parts already identified are denoted by the same reference numerals with the suffix B. In this embodiment, the second part of the tie comprises a precast brick 71 of the cementitious compound used for the face or refractory lining 52B bonded with a metal scoop-shaped part 72 from which projects in the direction away from the brick an apertured lug 73 fitting over the short arm 74 of an elbow rod the free end of whose longer arm 75 is threaded to engage in the tapped socket of the nut 68B. The length dimensions of the components making up the second part of the tie are such that the outer face of the brick 71 is flush with the outer surface of the cast block of the face lining 52B, and it will be manifest that such length dimensions may be varied as desired to suit different thicknesses of face lining.

Figure 9:
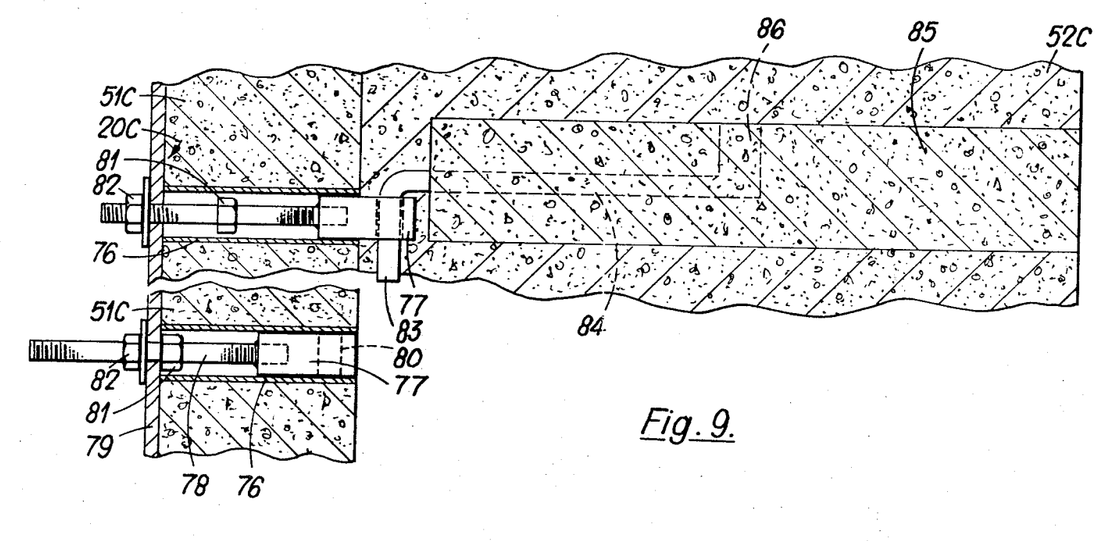
FIG. 9 is a view similar to FIG. 8 illustrating an alternative composite tie.

Referring now to FIG. 9 wherein parts already identified are denoted by the same reference numerals with the suffix C, the facing or insulating lining 52C is of much greater thickness than in the embodiments of FIGS. 5 to 7, being intended for a soaking pit. In this instance, both parts of the ties are modified. The first part of each tie is mounted in a steel tube 76, welded to the surface 20C to extend normal thereto, and comprises an anchor bolt with an elongate tubular head 77 which is a sliding fit in the tube 76 and a shank 78 which projects through an opening therefore in the steel casing 79 of the soaking pit. The head 77 has a vertical bore 80 near its end remote from the shank 78 and the shank has a fixed lock nut 81 which when hard against the surface 20C determines that the remote end of the bolt head 77 is flush with the free end of the tube 76. An adjusting nut 82 on the bolt shank 76 externally of the casing 79 enables the anchor bolt to be retracted inwardly of the tube 76 so that the head 77 is flush with the free end of the tube as indicated in the lower part of FIG. 9 or projected from the tube as shown in the upper part of FIG. 9 so that the bore 80 is free to permit passage of the downturned end 83 of an anchoring rod 84 embedded in a brick 85 previously cast in the cementitious compound in which the face or refractory lining is to be cast. The rod 84 extends with its axis substantially along the central longitudinal axis of the brick and has an offset head of 6 extending to a major surface of the brick 85. The bricks are of such length as to extend to the inner surface of the face lining to be cast. When the back or insulating lining is cast, each anchor bolt is retracted from the exterior of the casing 79 until the outer surface of the head 77 is flush with the free end of the tube 76. The blocks of the lining 51C are then cast as hereinbefore described and the anchor bolt heads are then projected from the tubes 76 and locked and the second part of each tie is then fitted. The blocks of the face or refractory lining 52C are then cast whereafter the guides and shutter plates are removed and the spaces between the blocks of both linings are filled as hereinbefore described. Manifestly as many ties are used as is deemed necessary for the work to be done.

Figure 10:
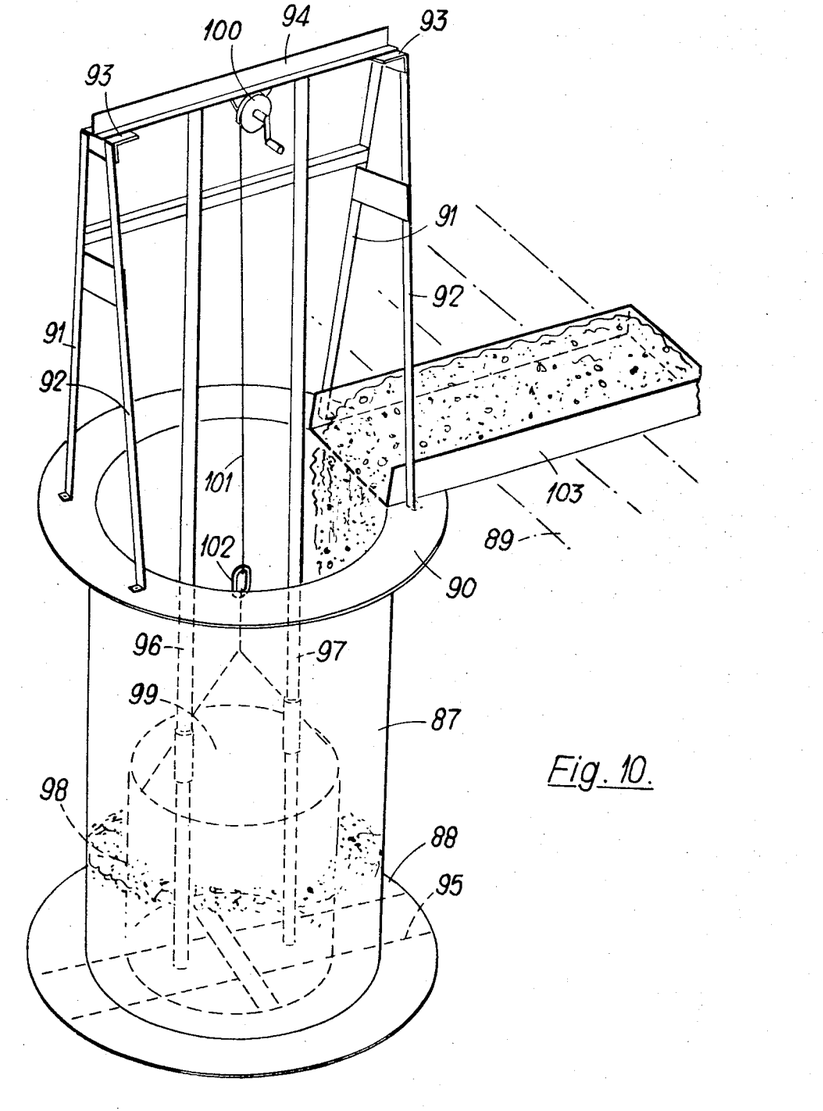
FIG. 10 is a perspective view illustrating a method of lining a cylindrical pipe.

Referring now to FIG. 10 of the drawings, a double lining is applied to the individual lengths of a metal cylindrical conduit of two and a half feet diameter to be composed of five-feet lengths each externally flanged at both ends to enable the lengths to be joined together by bolts passed through aligned holes in the flanges and locked by nuts.

The individual lengths 87 are prepared for lining by supporting same on end in an upright position at a height of say one and a quarter feet above floor level on a pair of spaced rolled steel channel-section members (not shown) disposed with the base vertical and the webs horizontal, planks (not shown) being fitted below the members as required to make the clearance of sufficient depth, such planks being disposed at right angles to the members.

Plywood discs (not shown) of ¾" thickness and of 3' to 4' diameter with a central hole of 11" diameter are bolted to the lower flanges 88 of the individual lengths 87 before the latter are positioned on the two channel section members.

Scaffolding (not shown) is erected to provide a platform 89 (only partly shown) along each side of the row of conduit length, the platform having a working height level with the upper flanges 90 of the conduit lengths.

A concrete mixer (not shown) is hoisted on to the platform 89 and is located in close proximity to the row of conduit lengths 87 and bags filled with the clay compound to be mixed for lining the conduit are placed adjacent the mixer. The outer lining i.e. that next to the wall of the conduit is to be an insulating lining and the inner lining a heat-resistant lining and the materials to be used therefor are preferably 1300° C. general purpose lightweight concrete and 1800° C. high alumina concrete, respectively.

The inside surfaces of the conduit lengths 87 are wire brushed and small steel anchors (not shown) are welded to the surfaces. Ports (not shown) of 1½" diameter in the conduit lengths are plugged by wooden dowels of such length as to extend inwardly 4⅝" from the inside surfaces of the conduit lengths. Over these dowels are placed previously cast sleeves of the inner lining material which fully cover the dowels. The purpose of these sleeves is to prevent hot gases in the region of the ports from escaping into the insulating lining when the conduit is in use.

A frame is mounted on the upper end of the conduit length and is made up of two side brackets of isosceles triangular shape in elevation and fabricated from 1½" x 1½" angle sections. Each bracket comprises a lower member (not shown) disposed with one web horizontal and having therein two holes at a little more than two feet centres, two side members 91 and 92 extending upwardly and inwardly one from adjacent each end of the horizontal member and welded both to the latter and to a short member 93 disposed with one web horizontal at the vertex formed by the side members coming together.

The two side brackets are mounted with their lower members parallel and the holes in the horizontal webs thereof mating with holes in the flange at the upper end of the conduit length to enable the bracket to be bolted in position. A crossbeam 94 comprises at 2" x 2" angle member adapted to be bolted to the horizontal webs of the two short members 93 and is provided centrally with depending spigot members (not seen) then to be symmetrically located one at each side of an axis coincident with the axis of the cylindrical conduit length.

A flat steel bar 95 is bolted at the lower end of the conduit length, being secured by bolts securing the plywood disc in place. The steel bar 95 is centrally intermediate and parallel to the two channel section members. The steel bar is provided with two upwardly-extending spigots (not seen) similar to and aligned with the spigots on the crossbeam 94.

Two tubes 96 and 97 are fitted on to the lower spigots and a hollow cylindrical former 98, closed at its upper end by an upright cone 99 cast from a refractory concrete and provided internally along diameters thereof with bracing straps (not shown) at its upper end below the cone and centrally of its height, is fitted over the tubes, holes being provided for this purpose in the cone 99 and the straps. The crossbeam 94 is now fitted over the upper ends of the tubes 96 and 97 with the upper spigots engaging therein and is loosely bolted to the short members 93 of the side brackets, the bolt holes in said short members being in the form of slots to enable positional adjustment of the crossbeam. A winch 100 is mounted on the crossbeam and a rope 101 therefrom extends downwardly centrally between the guide tubes and is secured to the apex of the cone 99 where there is a projecting eyebolt 102 secured at its inner end to the upper bracing strap. Gauges are placed against the external surface of the former 98 to ensure concentricity of the latter with the conduit length 87 and the crossbeam 94 is adjusted to suit and the bolts connecting same with the short members are fixed in position. The former 98 is lowered to the bottom of the conduit length 87 and rests there on the wooden disc.

The former for the outer lining is of 18" diameter and of 1'6" in height whereas that for the inner lining is of 12" diameter and of 2' in height. Both formers have vibrators mounted on the underside of their lower bracing straps.

The outer lining mix is prepared using 2 gallons and 7 pints of water per 50 kilogram of 1300° C. general purpose lightweight concrete and the mixing time is as short as possible. The mix is transferred to a tray 103 and scraped therefrom into the conduit length 87 to a height approximately 6" from the bottom of the latter. The layer of mix is rammed hard to ensure that there are no voids therein, and the procedure is repeated until the level of the mix is at the top of the cylindrical part of the former 98. The former 98 is then raised and is simultaneously vibrated. This is continued until the former is raised through 6" and a further batch of the mix is then added to bring the level again to the top of the cylindrical part of the former. The procedure is repeated until the top of the cylindrical part of the former 98 is 3" above the top of the conduit length. The top surface of the infilled mix is then vibrated with a flat vibrator plate (not shown) with a percussion type vibrator. The effect of this is to lower the top surface of the infilled mix by about 1" and this is made up to the level of the top of the conduit length and trowel finished. Shaped weights are then placed on the top surface of the infilled mix and the former is raised until its lower edge is clear of the top of the conduit length. The crossbeam is then unscrewed and the former is slipped off the guide tubes.

The smaller diameter former for the inner lining is then mounted for sliding movement on the guide tubes and is centralised in the manner already described for the other former. The wooden dowels are pushed further inwards until they project 4" beyond the already-cast outer lining.

The mixing, placing and vibrating procedure already described for the outer lining is repeated for the inner lining. A small qauntity of 1800° C. high alumina concrete which had been through a fine sieve is mixed and used as a mortar to render a smooth finish to the top surface.

After a short setting period the wooden formers are removed, a gentle tap being all that is necessary for this purpose.

Figure 11:
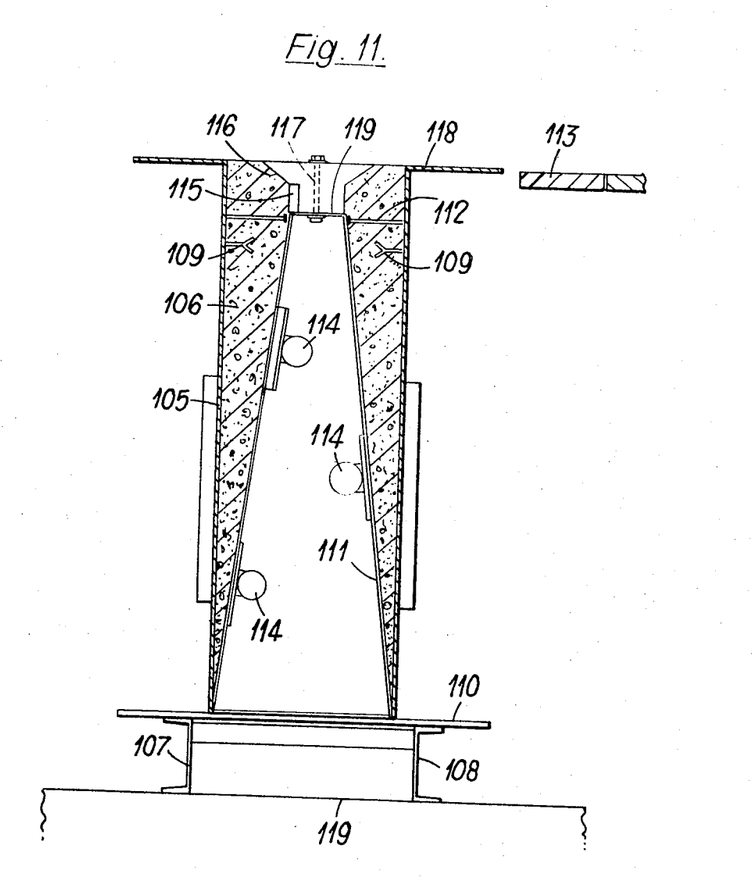
FIG. 11 is a sectional elevation illustrating a method of casting a venturi-shaped lining in a cylindrical pipe.

Referring now to FIG. 11 of the drawings, a cylindrical vessel 105 is to be provided with a venturi-shaped, refractory, lining 106, for example of 1800° C. high alumina concrete. Two rolled steel channels 107 and 108 are spaced apart in parallel relation on the floor 119 with their flanges extending away from one another, and planks 110 are disposed transversely on top of the channels to leave a clearance for passage of air pipes to the vibrators to be referred to hereinafter. Scaffolding is erected to provide platforms 113 on three sides of the position where the vessel is to be lined, and the various items required for the work, namely a concrete mixer, a quantity of the lining material in 50-lb. bags on pallets adjacent to the mixer, and various tools. The inside surface of the vessel 105 is wire brushed and four steel anchor ties 109 are welded to the inside surface of the vessel at equal spacings about the circumference of the vessel and in the same plane.

A hollow truncated-conical first former 111 is positioned with its smaller diameter end uppermost on the planks 110, the external surface of said former 111 coinciding with the internal surface of the major truncated-conical part of the venturi-shaped lining 106 to be cast. The former 111 is oiled. The vessel 105 is lowered by crane over the former 111 and concentricity of the two is ensured by placing a centering gauge 112 over the smaller diameter end of the first former 111 and adjusting the latter until concentricity is obtained.

The concrete mix is filled into the space between the first former and the inside surface of the vessel, care being taken that distribution about the cone is substantially even. The cone former 111 is vibrated through three vibrators 114 mounted at 120° intervals at different levels within the former. Filling of the mix into the aforesaid space is continued with continuance of the vibration until the level of the mix reaches the lower side of the centralising gauge 112. The latter is removed and a wooden former comprising a cylindrical throat section 115 and an inverted truncated-conical section 116 is forced onto the top end of the former 111 by a through-bolt 117. The mix is then placed and rammed around the wooden former until the infilled mix is level with the top surface of the steel flange 118 on the vessel 105.

After about five minutes the bolt 117 for the wooden former is withdrawn, and the wooden former is then rotated slightly about its axis and withdrawn. The lined vessel 105 is then raised slightly by crane, a distance of 6" being sufficient. A gentle tap on the top plate 119 of the first former 111 is sufficient to dislodge it and the lined vessel 105 is lifted clear and placed on its side on support rails. A quantity of 1800° C. high alumina concrete which has been through a fine sieve is mixed and used as a mortar to make good any small irregularities in the finished surface of the lining.

Figure 12:
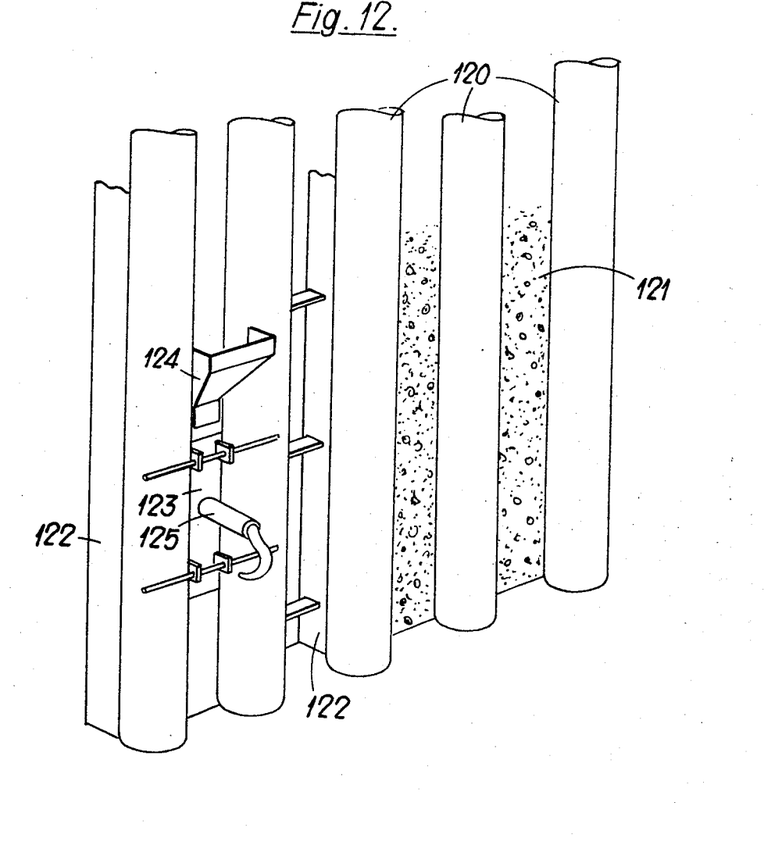
FIG. 12 is a perspective view illustrating a method of placing refractory concrete in tube banks.

Referring now to FIG. 12, a bank of tubes 120 is to have refractory concrete 121 placed between the tubes and against a backing surface (not shown). Wooden stops 122 are wedged between adjacent tubes 120 and the backing surface. A shutter 123 at the upper end of which is clamped a small hopper 124 is slidably supported between the adjacent tubes, for example as shown, and as before the refractory concrete mix is filled into the hopper and falls into the mould so constructed, the shutter 123 being vibrated by a vibrator 125 and being raised slowly as compaction of the infilled refractory concrete mix is achieved. The wooden stops 122 are removed and only one stop is required for each subsequent run.

Figure 13:
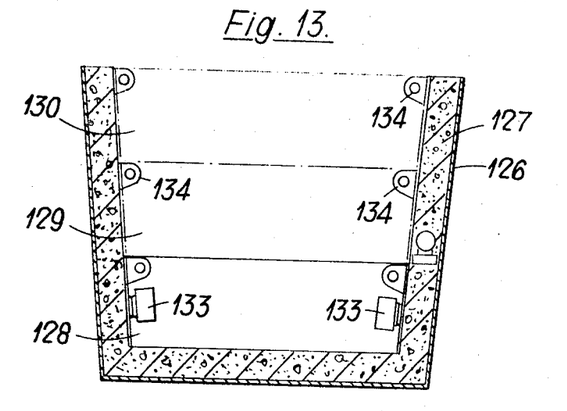
FIG. 13 is a sectional elevation illustrating the lining of a foundry ladle.
Figure 14:
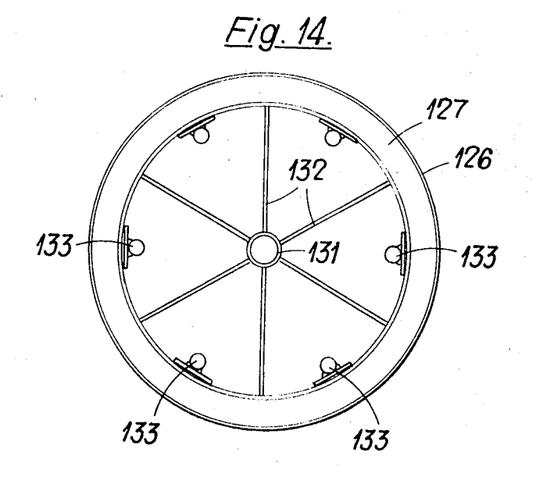
FIG. 14 is a plan view corresponding to FIG. 13 but showing also a stiffening and centering frame omitted from FIG. 13 for the sake of clarity.

FIGS. 13 and 14 illustrate the lining of a foundry ladle 126 with a refractory lining 127. Use is made of three inter-related truncated-conical formers 128, 129, 130 together providing a complete former for the ladle 126. Initially the bottom surface of the ladle 126 is lined and the bottom former 128 is placed in position. As shown in FIG. 14, the formers have an internal stiffening frame made up of a central cylindrical tube 131 and circumferentially-spaced radial struts 132. The frame also serves for centering the former in the ladle prior to casting the lining. Each former is fitted with a circumferentially-spaced series of vibrators 133 and diametrically-opposed lifting lugs 134 to facilitate manipulation by crane. With the former 128 in position, the lower part of the circumferential wall lining is cast with vibrations of the former as the concrete mix is filled into the mould defined by the former. When the mix has reached the level of the top of the former 128, a tap-weighted vibrator 135 is placed thereon and is moved around the entire former. The tap-weighted vibrator 135 is then removed and the intermediate former 129 is placed in position on top of the former 128 and centered. The casting of the lining is continued in the same way as with the former 128, and finally the top former 130 is positioned and the lining completed. The formers 128, 129, and 130 are removed when the lining 127 has been completed.

Where appropriate, ceramic fibers, fibrous stainless steel or carbon fibres may be added to the concrete mix, the fibres being of the order of 10 to 100 mm. in length.

The invention is applicable generally where lining or coating of structures is required, and further example of civil engineering applications are in the lining of tunnels and sewers.

The concrete mixes used in the present invention contain no more water than is necessary for the purpose and are rapidly compacted in the mould bounded by the shutter the guides and the surface being clad or lined, being keyed to the latter by the ties. Indeed the compaction is so rapid that it is necessary to keep topping up with the mix.

The present invention substantially cuts down, if not obviates, wastage of material, enables the production of uniform coatings, obviates the need for shuttering, and is economical both in time and labour.

What is claimed is:

1. A method of coating a structural surface with a cementitious compound, said method comprising the steps of:
   (a) securing to said surface at spaced intervals to project outwardly therefrom non-linear ties which extend in the direction away from said surface;
   (b) removably securing to said surface and clear of said ties at least one pair of vertical guides the mutually proximate surfaces of which each have intermediate their width a vertical rib with the two ribs having faces remote from said surface which are co-planar and are parallel to said surface;
   (c) mounting between said at least one pair of vertical guides for sliding movement therealong parallel to said surface and more remote from said surface than said vertical ribs and the free ends of said ties a shutter plate whose surface facing said structural surface is parallel to the latter and defines a mould with the mutually proximate surfaces of said guides;
   (d) filling a cementitious compound into said mould;
   (e) inducing in said shutter plate small vibrations of rapid frequency to compact the volume of said cementitious compound in said mould;
   (f) sliding said shutter plate upwards along said guide at a rate determined by the rate of compaction of said cementitious compound in said mould while continually filling said cementitious compound into said mould and inducing small vibrations of rapid frequency in said shutter plate, to produce a block of said cementitious compound bonded to said structural surface and whose height is determined by the length of said guides, said block having in its side faces grooves extending parallel to said structural surface;
   (g) repeating steps (b) to (f) as often as required to provide blocks of said cementitious compound bonded to said structural surface at small intervals apart in the horizontal direction, dismounting said guides, and filling the space between each two adjacent blocks with said cementitious compound utilising a shutter plate bridging between said blocks and having side flanges engaging slidingly in said grooves, and carrying out the same sequence of operations as in the casting of said blocks.

2. A method according to claim 1, including the step of mechanically assisting said upwards sliding of said shutter plate.

3. A method according to claim 2, including placing on top of the cementitious compound in said mould when said shutter plate has been raised to the position wherein its upper edge is substantially level with the tops of the guides and the final amount of said cementitious compound has been filled into said mould, a weight shaped to fit snugly the mould horizontal cross-section, and removing said weight when vibration of said shutter plate has terminated.

4. A method of coating a structural surface with a double lining, that is a back lining and a face lining of different cementitious compounds, said method comprising carrying out the steps of claim 1 but with vertical guides which project forwardly from said surface a distance equivalent to the full thickness of the double lining and provide vertical guidance for shutter plates both at the requisite distance from said surface for the back lining and at the requisite distance from said surface for the face lining, comprising the steps of:
   (a) casting blocks of a first cementitious compound for the back lining;
   (b) casting on the already-cast back-lining blocks of a second cementitious compound for the face lining;
   (c) dismantling said guides;
   (d) filling the spaces between the back-lining blocks with said first cementitious compound to complete the back lining; and
   (e) filling the spaces between the face-lining blocks to complete the face-lining.

5. A method according to claim 4 but modified by the use of non-linear ties each comprising two parts, namely a first part to be secured to the structural surface to project outwardly therefrom the full thickness of the contemplated back lining and presenting a tapped socket at its end remote from said structural surface, and a second part providing an anchor fitted with a threaded stem engageable in said tapped socket with said anchor extending forwardly from the latter across at least the greater part of the thickness of the contemplated face lining, said method including the steps of:
   (a) engaging in said threaded stems, prior to casting the blocks of the first cementitious compound for the back lining, plugs which are distinctively coloured in relation to said first cementitious compounds;
   (b) removing said plugs when cleared by the shutter plates during casting of said blocks of said first cementitious compound;
   (c) engaging said threaded stems in said tapped sockets; and
   (d) casting the blocks of the second cementitious compound for the face lining.

6. A method according to claim 5, in which said anchor is V-shaped with the vertex of the V joined to said threaded stem.

7. A method according to claim 5, in which said anchor is a ceramic tile.

8. A method according to claim 5, in which said anchor is a block cast from said second cementitious compound and of length to extend forwardly from said threaded stem across the full thickness of the contemplated face lining.

9. A method according to claim 4, including the preliminary steps of securing to said surface at spaced intervals to project normally therefrom steel tubes of length equivalent to the thickness of said back lining, mounting co-axially within said tubes threaded bolts whose stems extend through holes in the casing affording said structural surface and project to the exterior an amount enabling forward projection from the free ends of said tubes of major lengths of elongate cylindrical heads on said bolts, said heads being flush with said free ends prior to casting said back lining and affording through openings with vertical axes casting said back lining blocks, filling the spaces between said back lining blocks, projecting said bolts forwardly from the completed back lining, engaging in said through openings downwardly-extending free lengths of elbow rods whose other lengths are embedded in anchor bricks cast from said second cementitious compound and of length to extend the full thickness of said face lining, casting on said back lining to integrate with said anchor bricks said face lining blocks, and filling the spaces between said face lining blocks.

(References on following page)

References Cited

UNITED STATES PATENTS

| | | | |
|---|---|---|---|
| 3,423,492 | 1/1969 | Jonell | 425—63 X |
| 3,015,260 | 1/1962 | Pelsue | 425—63 X |
| 3,587,198 | 6/1971 | Hensel | 264—35 X |
| 834,253 | 10/1906 | Bieber | 425—63 |
| 827,712 | 8/1906 | Daniel | 249—15 |
| 1,465,545 | 8/1923 | Demongeot | 264—DIG. 66 |
| 2,769,333 | 11/1956 | Reintjes | 52—707 X |
| 1,934,760 | 11/1933 | Awbrey | 52—713 X |
| 2,736,937 | 3/1956 | Knapp | 264—267 X |

FOREIGN PATENTS

| | | | |
|---|---|---|---|
| 252,523 | 1963 | Australia | 52—707 |
| 296,256 | 1964 | Netherlands | 264—33 |

ROBERT F. WHITE, Primary Examiner

T. P. PAVELKO, Assistant Examiner

U.S. Cl. X.R.

52—701, 707, 713; 249—15, 25; 264—30, 256, 261, 269, 274, 308, 333, DIG. 57; 425—63